United States Patent
Imai

(10) Patent No.: US 7,669,859 B2
(45) Date of Patent: Mar. 2, 2010

(54) CYLINDER HEAD GASKET

(75) Inventor: Toshihiro Imai, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 684 days.

(21) Appl. No.: 11/639,152

(22) Filed: Dec. 15, 2006

(65) Prior Publication Data

US 2007/0164518 A1   Jul. 19, 2007

(30) Foreign Application Priority Data

Jan. 16, 2006   (JP) .............................. 2006-007630

(51) Int. Cl.
*F02F 11/00* (2006.01)
(52) U.S. Cl. ..................... 277/592; 277/594; 277/597
(58) Field of Classification Search ............... 277/592, 277/594–7
See application file for complete search history.

(56) References Cited

U.S. PATENT DOCUMENTS

| | | | | |
|---|---|---|---|---|
| 2,699,349 A * | 1/1955 | Brownlee | ................... | 277/592 |
| 3,606,360 A * | 9/1971 | Barker | ........................ | 277/650 |
| 4,635,949 A * | 1/1987 | Lucas et al. | .................. | 277/595 |
| 4,676,514 A * | 6/1987 | Beutter et al. | ............... | 277/596 |
| 4,979,758 A * | 12/1990 | Miyaoh | ...................... | 277/595 |
| 5,348,311 A * | 9/1994 | Miyaoh et al. | .............. | 277/598 |
| 5,427,389 A * | 6/1995 | Ishikawa et al. | ............. | 277/595 |
| 5,478,092 A * | 12/1995 | Ishikawa et al. | ............. | 277/595 |
| 5,806,857 A * | 9/1998 | Mockenhaupt et al. | ...... | 277/595 |
| 6,206,381 B1 * | 3/2001 | Ii et al. | ........................ | 277/593 |
| 6,926,282 B2 * | 8/2005 | Werz et al. | ................... | 277/591 |
| 2006/0131818 A1 * | 6/2006 | Diez et al. | ................... | 277/592 |
| 2006/0197288 A1 * | 9/2006 | Sakamoto | .................... | 277/592 |

\* cited by examiner

*Primary Examiner*—Alison K Pickard
(74) *Attorney, Agent, or Firm*—Manabu Kanesaka

(57) ABSTRACT

A cylinder head gasket is formed of at least one metal plate for forming the gasket. The gasket includes cylinder bores, and sealing devices or beads to surround the cylinder bores. A notch portion for reducing surface pressure is provided at a flat portion of the at least one metal plate where a rigidity of the sealing device is not affected.

9 Claims, 2 Drawing Sheets

CYLINDER HEAD GASKET

BACKGROUND OF THE INVENTION AND RELATED ART STATEMENT

The present invention relates to a cylinder head gasket sandwiched between two engine members such as a cylinder head, a cylinder block and the like, of an engine for sealing.

In a state of the cylinder head gasket being sandwiched between a cylinder head and a cylinder block (cylinder body) of an automobile engine (internal combustion engine), the cylinder head gasket is tightened by head bolts to seal fluids such as combustion gas, oil, coolant water and the like.

Recently, as a method for reduction in weight of an engine, it has been progressed that an aluminum alloy is used as an engine material and an engine is made thinner, which causes lower rigidity of the engine. Accordingly, in view of the condition of sealing of a recent head gasket for a multi-cylinder engine, there has been a tendency of increasing a failure of local leaking of combustion gas. The major factors are increases of a local lower rigidity of an engine and an unbalanced temperature distribution.

Especially, with the lower rigidity of the engine, an amount of tightening force is restricted when the gasket is tightened. Accordingly, sealing surface pressure tends to become lower around a combustion chamber (cylinder bore). As a measure for the decrease of a sealing surface pressure, in order to reinforce the surface pressure, an entire surface pressure is increased at a sealing portion around a combustion chamber, and a material of a bead is changed to a material having spring action. Also, a method using a reinforce plate such as a shim has been commonly employed.

As one of the measures, in a metal gasket provided with a seal bead around the combustion chamber for increasing the surface pressure, a metal gasket has been provided with a slit for decreasing a rigidity of the seal bead outside the seal bead around the combustion chamber except a space between the adjacent combustion chambers to thereby enhance a tightening ability between the adjacent combustion chambers (for example, refer to Japanese Patent Publication No. TOKKAI 2001-132843).

In the metal gasket, since the tightening force becomes insufficient between the combustion chambers by the rigidity of the seal bead around the combustion chamber except the space between the combustion chambers, the bead rigidity of the seal bead is partially adjusted by the slit to thereby improve the tightening ability.

On the other hand, the cylinder head gasket has portions contributing to sealing such as the seal bead and like around the combustion chamber, a water hole, a fluid hole, a bolt hole and the like, and the other portions except the portion described above. The tightening forces by the tightening bolts are mainly applied to the portion contributing to sealing, but also applied to the other portions. Surface pressures are low at the other portions, and parts of clamp forces do not directly contribute to sealing since the dimensions are relatively large. Thus, there is a problem that the clamp load for sealing can not be sufficiently used for sealing.

Also, with the lower rigidity of the engine, the cylinder head is distorted to concave downward at a longitudinal center portion of a joint surface for a grommet and a bead of the combustion chamber hole. Accordingly, there is a problem of being deteriorated in a sealing ability between the joint surfaces.

As a measure for the problem, a metal gasket has been provided with projections having capabilities of a heat resistance, an incompressibility, and a non-deforming ability, at both ends in a longitudinal direction of the gasket. When the tightening bolts are tightened, a space between the cylinder head and the cylinder block does not become narrow at the both ends in the longitudinal direction of the engine. Therefore, the joint surface of the cylinder head is not distorted to concave downward at the longitudinal center portion to thereby prevent curving (for example, refer to Japanese Patent Publication No. TOKKAI H09-292027).

The projection is formed with a fluid coating material such as an epoxy resin or the like by a screen printing and a filling of a hard synthetic resin layer such as the epoxy resin in an inner space of an emboss bead integrally provided in a metal plate. Therefore, there is a problem of slightly increasing the weight of the projection to thereby increase the coating process of the epoxy resin.

The present invention is provided to solve the problems described above. An object of the present invention is to provide a cylinder head gasket provided with a notch portion for reducing surface pressure to thereby reduce the surface pressure at the portion which does not directly contribute to the sealing surface pressure. Therefore, the clamp load of the reduced surface pressure is used for the sealing surface pressure to thereby increase the sealing surface pressure around the combustion chamber. Accordingly, an excellent sealing ability can be obtained.

Further objects and advantages of the invention will be apparent from the following description of the invention.

SUMMARY OF THE INVENTION

In order to attain the object described above, a cylinder head gasket according to the present invention is formed of a single or plural metal plates for multi-cylinder engine. The cylinder head gasket is provided, in any metal structure plate of the cylinder head gasket, with a notch portion for reducing a surface pressure provided at a flat portion without a seal bead and which does not affect a rigidity of the seal bead of a combustion chamber.

According to the structure, a part of the flat portion in the metal structure plate provided with no seal bead for the combustion chamber hole, i.e. a portion with a low surface pressure, is cut out to provide the notch portion for reducing surface pressure. Therefore, useless clamp load which does not contribute to sealing is allocated to a bead portion to thereby improve sealing ability.

In the above cylinder head gasket, a cylinder head gasket provided with bolt holes disposed to surround the combustion chamber is formed to have the notch portion for reducing surface pressure. The notch portion is provided at a portion surrounded by the bolt hole and an edge of the cylinder head gasket where the combustion chamber hole is not disposed.

Alternatively, in the above cylinder head gasket, the notch portion for reducing surface pressure is provided to partially surround a corner part of the bolt hole located on a corner of the cylinder head gasket.

In providing the notch portion for reducing surface pressure around the bolt hole, especially, the clamp load on the bead around the bolt hole is increased to thereby reduce a head deflection and a bore deformation. Accordingly, an excellent sealing ability on a cylinder bore can be obtained.

Furthermore, in the above cylinder head gasket, when a cylinder head gasket formed of more than three metal plates is provided with the notch portion for reducing the surface pressure in an intermediate metal plate, the notch portion does not appear on the surface to affect a contact surface with an engine member. Therefore, the surface pressure can be reduced at the portion provided with the notch portion for reducing the surface pressure.

According to the metal gasket of the present invention, the notch portion for reducing the surface pressure is provided at a part of the flat portion in the metal base plate which is provided with no seal bead for the combustion chamber. Accordingly, the useless clamp load which does not contribute to the sealing is allocated to the bead portion to thereby improve the sealing ability.

Additionally, in providing the notch portion for reducing the surface pressure around the bolt hole, especially, the clamp load on the bead around the bolt hole is increased to thereby reduce the head deflection and the bore deformation.

DETAILED DESCRIPTION OF PREFERRED EMBODIMENT

Next, embodiments of a cylinder head gasket according to the present invention will be explained with references to the accompanying drawings.

FIGS. 1 to 4 are schematically explanatory drawings showing a structure for an easy understanding. Thus, the sizes of the combustion chambers, bolt holes, and seal beads, measurements of the notch portions for reducing surface pressure, thickness of metal base plates and the like, are different from the actual sizes.

The cylinder head gasket according to the present invention is a metal gasket sandwiched between engine members such as a cylinder head and a cylinder block (cylinder body) of an engine. The cylinder head gasket seals combustion gas with high temperature and high pressure in the combustion chamber (cylinder bore) and fluids such as coolant water and oil passing through coolant water passage and coolant oil passage.

The cylinder head gasket is formed of a single or plural metal structure plates (metal base plates) made of a mild steel plate, a stainless annealed material (anneal material), stainless thermal refining material (spring steel plate), and the like. Also, the cylinder head gasket is produced in accordance with a shape of the engine member such as the cylinder block or the like, and comprises the combustion chambers, fluid holes for circulating the coolant water and the engine oil, head bolt holes for tightening head bolts, and the like.

Figure 1:
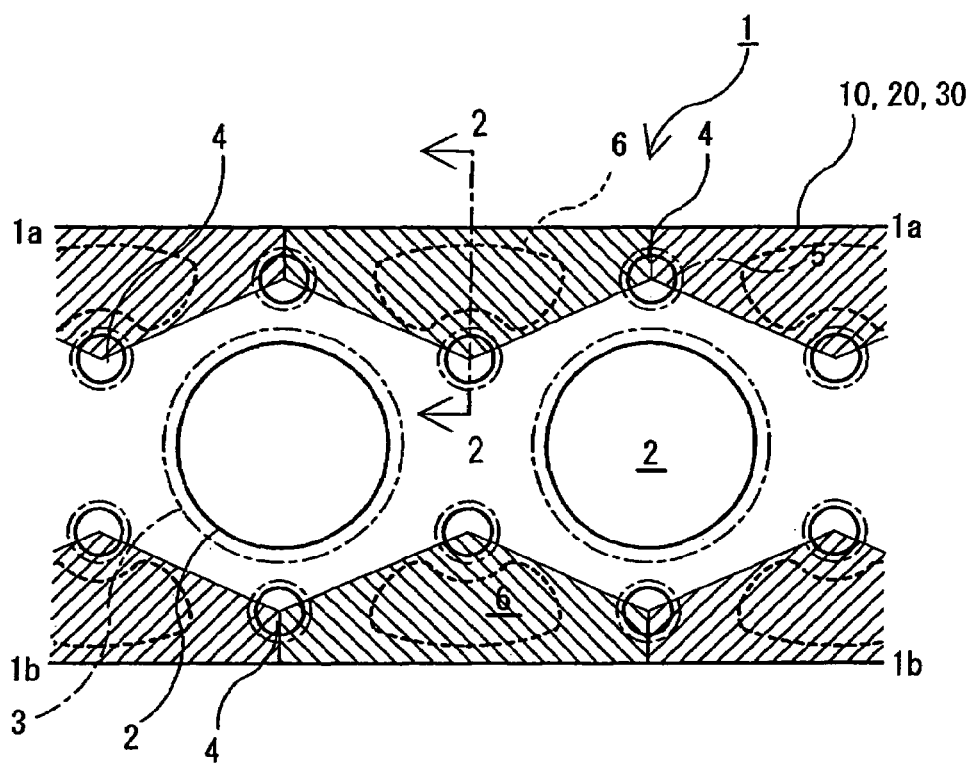
FIG. 1 is a plan view showing a metal gasket of a first embodiment according to the present invention.
Figure 2:
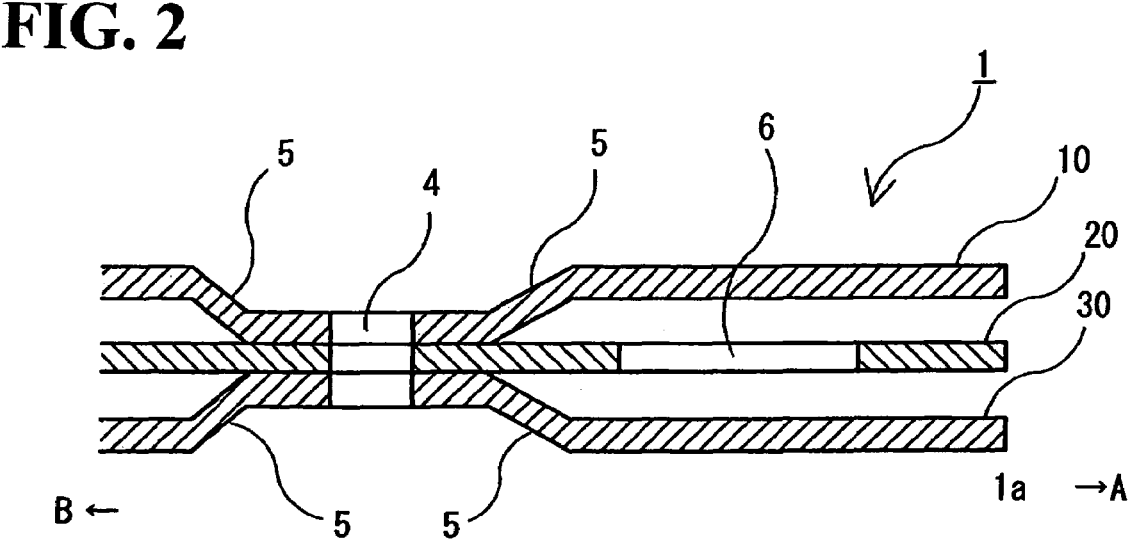
FIG. 2 is an enlarged sectional view taken along line 2-2 in FIG. 1.

A cylinder head gasket 1 of a first embodiment showing in FIGS. 1 and 2, is a cylinder head gasket laminated with three metal plates 10, 20, and 30 for a multi-cylinder engine. Full beads 3 are provided around combustion chamber holes 2 as seal beads in the first metal structure plate 10 and the third metal structure plate 30 of the three metal structure plates. Also, bolt holes 4 are provided to surround the combustion chamber holes 2, and half beads 5 for sealing are provided around each bolt hole 4.

In the present invention, notch portions (slits) 6 for reducing surface pressure are provided, in any of the metal structure plates 10, 20, and 30 (the metal structure plate 20 in FIG. 2), at a flat portion except for the seal beads 3 and 5. The notch portions 6 do not affect a rigidity of the seal beads 3 of the combustion chamber holes 2. In the structure of FIGS. 1 and 2, the notch portions 6 are provided at portions surrounded by the bolt hole 4 and an edge 1a (or 1b) of the cylinder head gasket 1 where the combustion chamber holes 2 are not disposed, i.e. a hatching portion in FIG. 2.

According to the structure, a part of the flat portion in the metal base plate 20 provided with no sealing means such as the seal beads 3 for the combustion chamber holes 2 and the seal beads 5 for the bolt holes 4 and the like, is cut out to provide the notch portions 6. Therefore, a useless clamp load which does not contribute to sealing is allocated to the bead portions to thereby improve a sealing ability.

In the structure of FIG. 2, the notch portion 6 for reducing the surface pressure is provided in the metal structure plate 20 as an intermediate plate. Therefore, the notch portion 6 for reducing surface pressure does not appear on the surface of the gasket 1, so that the notch portion does not contact the engine member to cause scratches by the corner portion of the notch portion 6. That is, with regard to the surface plates 10 and 30 which contact the engine members, there is no change from the conventional cylinder head gasket, but the surface pressure can be reduced at the portion where the notch portion 6 for reducing surface pressure is provided.

Figure 3:
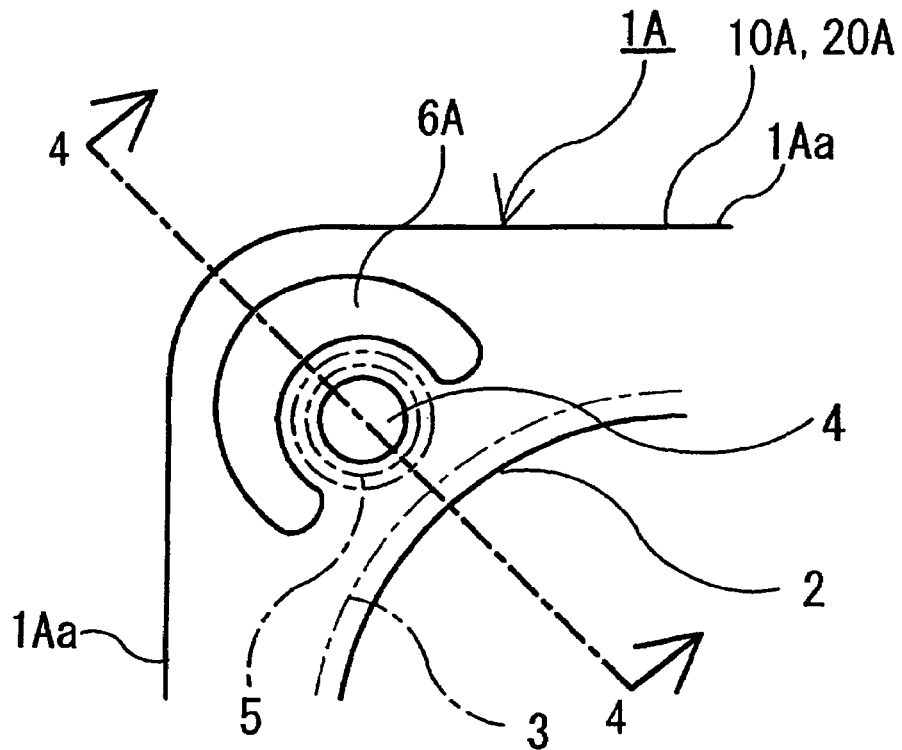
FIG. 3 is a partial plan view showing a metal gasket of another structure of a second embodiment according to the present invention.
Figure 4:
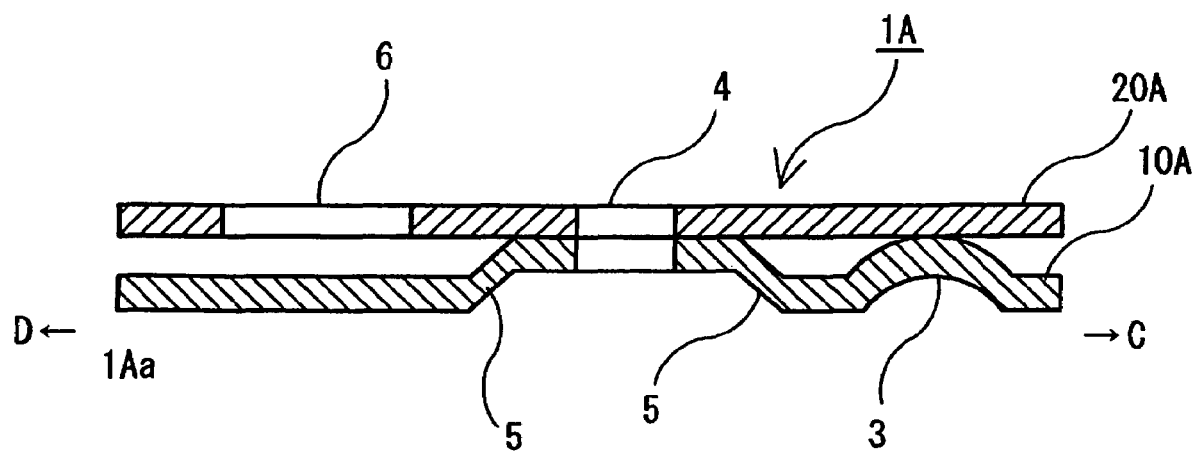
FIG. 4 is a sectional view taken along line 4-4 in FIG. 3.

Next, a cylinder head gasket 1A of a second embodiment shown in FIGS. 3 and 4 will be explained. The cylinder head gasket 1A is a cylinder head gasket laminated with two metal structure plates 10A and 20A for a multi-cylinder engine. The full beads 3 are provided as seal beads around the combustion chamber holes 2 in the metal structure plate 10A. Also, the bolt holes 4 are provided to surround the combustion chamber holes 2, and the half beads 5 for sealing are provided around each bolt hole 4.

On the corner of the second metal structure plate 20A of the cylinder head gasket 1A, a notch portion 6A for reducing the surface pressure is provided to partially surround a corner part of the bolt hole 4 located on a corner of the cylinder head gasket 1A. In providing the notch portion 6A for reducing surface pressure around the bolt hole 4, especially, the sealing surface pressure on the half bead 5 around the bolt hole 4 is increased to thereby reduce a head deflection and a bore deformation. Accordingly, an excellent sealing ability on the combustion chamber hole 2 can be obtained.

The disclosure of Japanese Patent Application No. 2006-007630 filed on Jan. 16, 2006 is incorporated as a reference.

While the invention has been explained with reference to the specific embodiments of the invention, the explanation is illustrative and the invention is limited only by the appended claims.

What is claimed is:

1. A cylinder head gasket, comprising:
at least one metal plate for forming the gasket,
cylinder bores formed in the at least one metal plate,
bolt holes formed in the at least one metal plate and arranged to surround the cylinder bores,
beads as sealing means formed at the at least one metal plate to surround the cylinder bores for sealing around the cylinder bores, and
a notch portion for reducing surface pressure provided at a flat portion of the at least one metal plate where a rigidity of the sealing means is not affected, said notch portion being provided at a portion between two cylinder bores adjacent to each other and between an edge of the at least one metal plate and a line connecting two bolt holes located adjacent to each other and adjacent to said edge.

2. A cylinder head gasket according to claim 1, further comprising another notch portion provided to partially surround the bolt hole between a corner of the at least one metal plate and the bolt hole adjacent thereto.

3. A cylinder head gasket according to claim 2, wherein said cylinder head gasket comprises first and second metal plates, said first metal plate having the beads as the sealing means and said second metal plate having said notch portion and another notch portion for reducing surface pressure.

4. A cylinder head gasket according to claim 3, wherein said cylinder head gasket further comprises a third metal plate laminated under the second metal plate and having beads as the sealing means.

5. A cylinder head gasket according to claim 4, further comprising half beads surrounding the bolt holes, said notch portion being providing outside the half beads.

6. A cylinder head gasket, comprising:
  first and second metal plates laminated together for forming the gasket,
  cylinder bores formed in the first and second metal plates,
  bolt holes formed in the first and second metal plates and arranged to surround the cylinder bores,
  beads integrally formed with the first metal plate to surround the cylinder bores and the bolt holes individually for sealing the cylinder bores and the bolt holes, and
  a notch portion for reducing surface pressure provided only at a flat portion of the second metal plate, said notch portion being formed at a portion between two cylinder bores adjacent to each other and between an edge of the second metal plate and a line connecting two bolt holes located adjacent to each other and adjacent to said edge.

7. A cylinder head gasket according to claim 6, further comprising another notch portion provided in the second metal plate to partially surround a corner bolt hole between a corner of the second metal plate and the corner bolt hole adjacent thereto, one of the beads formed in the first metal plate completely surrounding the corner bolt hole between the another notch portion and the corner bolt hole.

8. A cylinder head gasket according to claim 7, wherein said beads formed around the bolt holes are half beads.

9. A cylinder head gasket according to claim 8, wherein said notch portion is located between the edge of the second metal plate and one bolt hole located between the two cylinder bores adjacent to each other.

* * * * *